F. H. BEACH.

MACHINE FOR ATTACHING STAYS TO THE CORNERS OF BOXES.

No. 11,167. Reissued May 26, 1891

Witnesses:-
Louis M. T. Chilchud.
George W. Higgins Jr.

Inventor:-
Fred H. Beach.
by:- Dayton, Poole & Brown
his Attorneys:-

F. H. BEACH.
MACHINE FOR ATTACHING STAYS TO THE CORNERS OF BOXES.
No. 11,167. Reissued May 26, 1891.
Fig. 2.
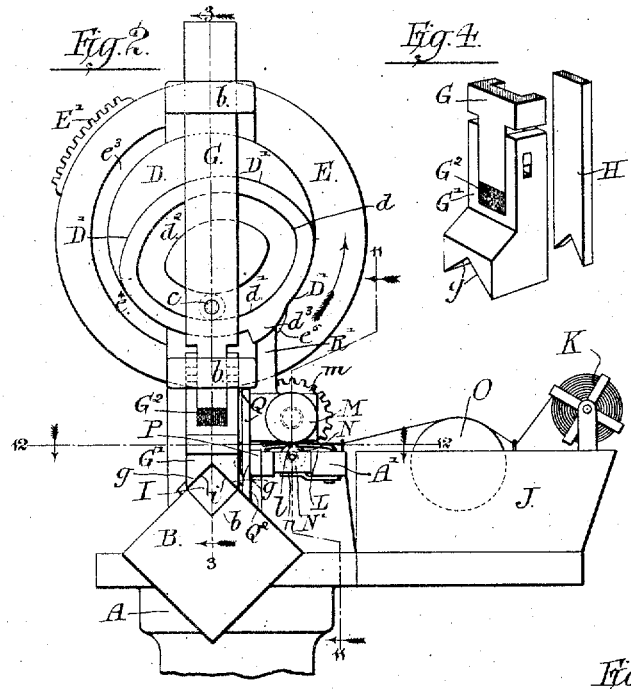
Fig. 4.
Fig. 5.
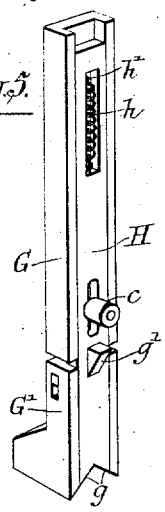
Fig. 3.
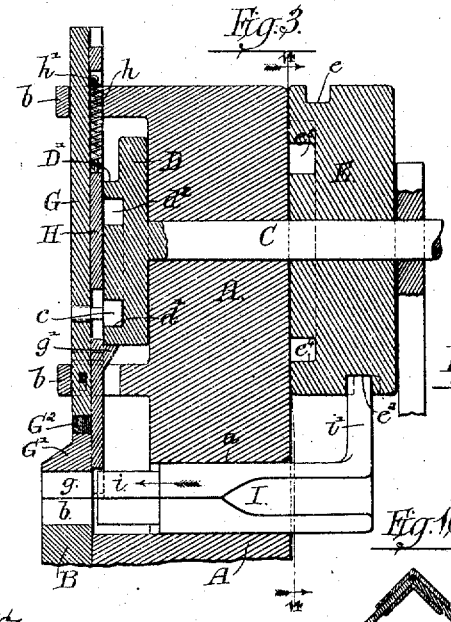
Fig. 7.
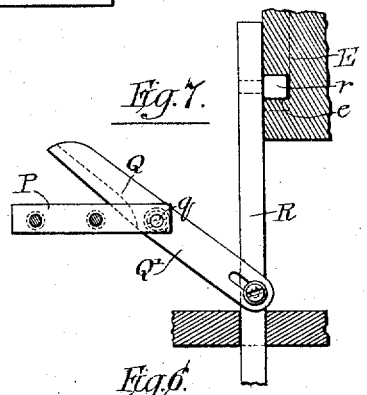
Fig. 6.
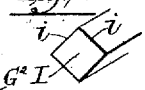
Fig. 8.
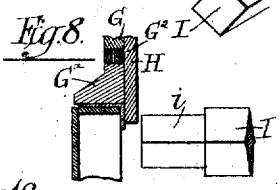
Fig. 9.
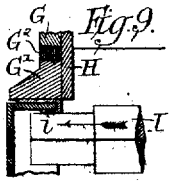
Fig. 10.
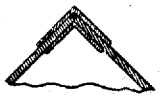
Witnesses:-
Louis W. F. Whitehead.
George W. Higgins Jr.
Inventor:-
Fred H. Beach.
by:- Dayton, Toole & Brown
his Attorneys.

F. H. BEACH.

MACHINE FOR ATTACHING STAYS TO THE CORNERS OF BOXES.

No. 11,167. Reissued May 26, 1891.

Witnesses.
Louis M. T. Whitehead.
George H. Higgins Jr.

Inventor:
Fred H. Beach.
by:- Dayton Poole & Brown
his Attorneys.

BEST AVAILABLE COPY BEST AVAILABLE COPY

UNITED STATES PATENT OFFICE.

FRED H. BEACH, OF ROCHESTER, NEW YORK.

MACHINE FOR ATTACHING STAYS TO THE CORNERS OF BOXES.

SPECIFICATION forming part of Reissued Letters Patent No. 11,167, dated May 26, 1891.

Original No. 447,225, dated February 24, 1891. Application for reissue filed April 9, 1891. Serial No. 388,344.

*To all whom it may concern:*

Be it known that I, FRED H. BEACH, of the city of Rochester, in the county of Monroe and State of New York, have invented a certain new and useful Improvement in Machines for Attaching Stays to the Corners of Boxes; and I do hereby declare that the following is a full, clear, and exact description thereof, reference being had to the accompanying drawings, and to the letters of reference marked thereon, which form a part of this specification.

It has been customary heretofore in making paper or straw-board boxes to apply a stay or fastening strip over the joints at the corners of the boxes, which strip is pasted down on the outside of the box or is folded over the edge of the box and secured by paste both outside and inside of the corner, and such work, as far as I am aware, has heretofore been done by hand.

My invention relates to a machine for doing this work; and it consists in the matters hereinafter set forth, and pointed out in the appended claims.

Figure 1:
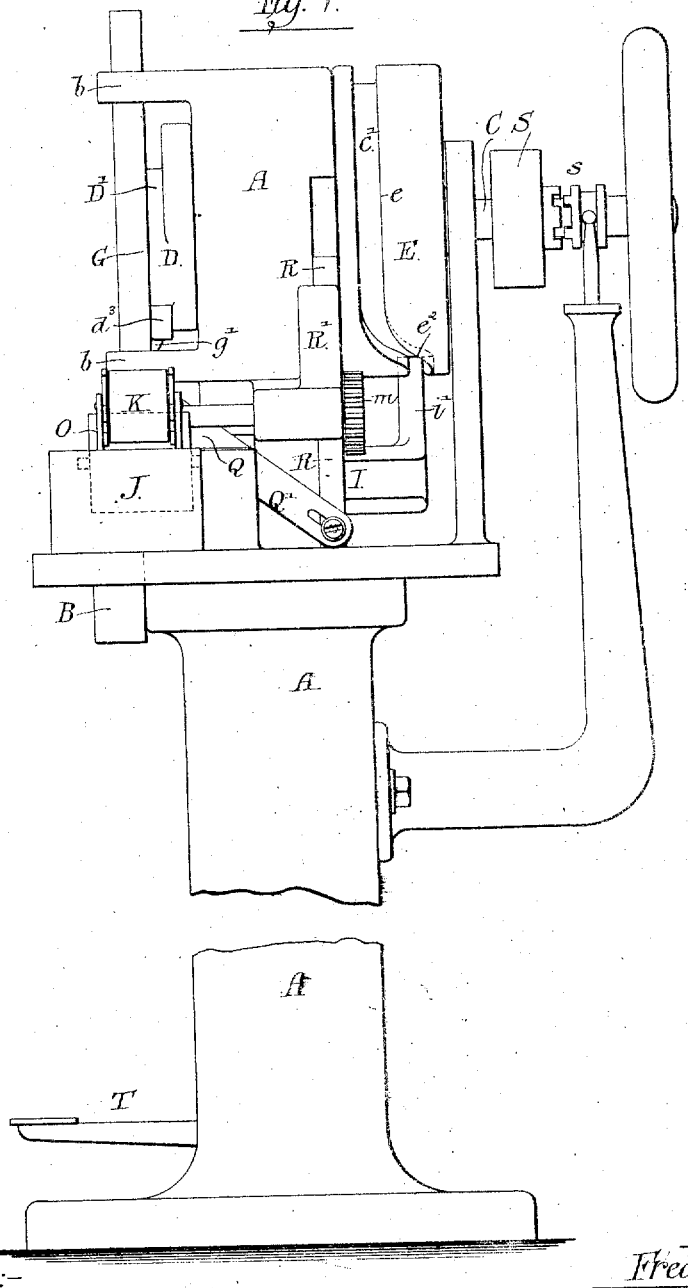
Figure 11:
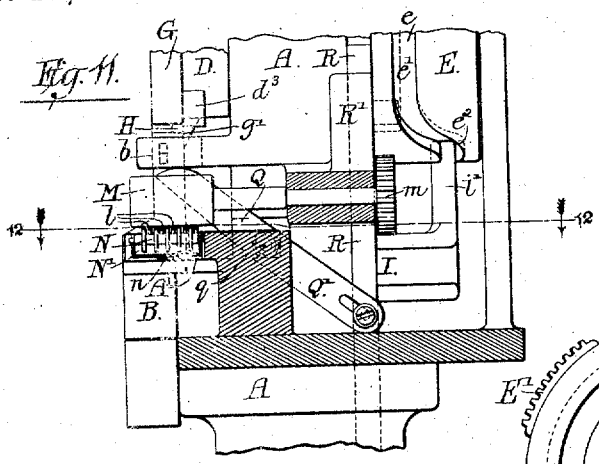
Figure 14:
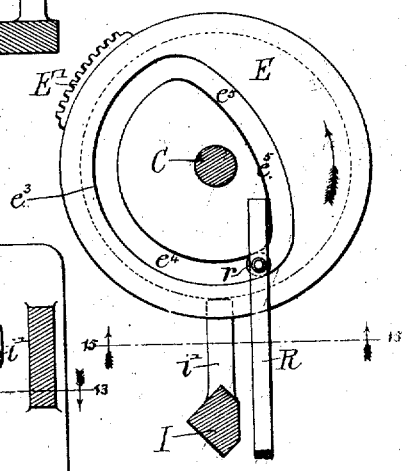
Figure 12:
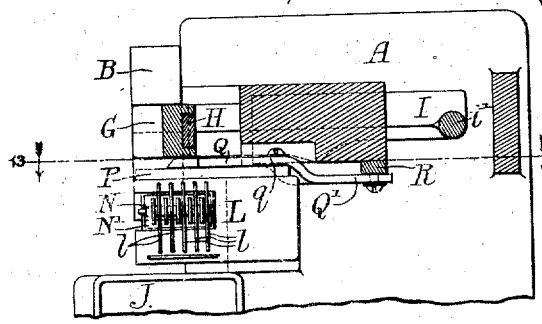
Figure 15:
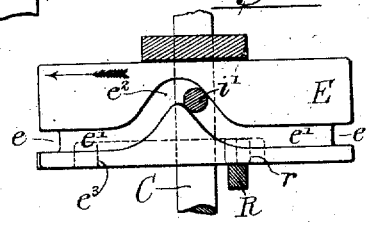
Figure 13:
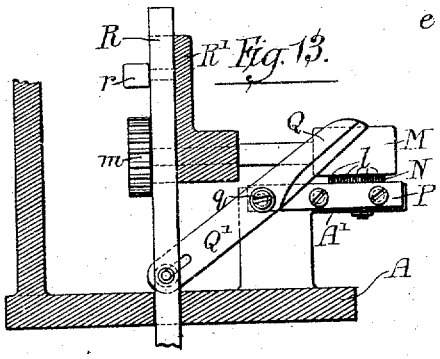

In the accompanying drawings, illustrating my invention, Figure 1 is a side elevation of a machine embodying the invention. Fig. 2 is a front elevation of the same in a plane at right angles to Fig. 1. Fig. 3 is a vertical cross-section taken upon line 3 3 of Fig. 2. Fig. 4 is a perspective view of the lower end of the upper die or plunger and the secondary or turning-in plunger of the machine. Fig. 5 is a perspective view of the two plungers when placed together, showing the entire length of the same as seen from the rear side thereof. Fig. 6 is a perspective view of the front end of the lower die. Fig. 7 is a detail side elevation of the shears or cutters by which the strip is severed. Figs. 8 and 9 are sectional views showing the opposing clamping-dies, illustrating the process of applying the stay to the corner of the box. Fig. 10 is a sectional view of one corner of the complete box, taken on a plane parallel with the bottom of the box. Fig. 11 is a vertical section of parts of the machine, taken upon line 11 11 of Fig. 2. Fig. 12 is a plan section taken upon line 12 12 of Figs. 2 and 11. Fig. 13 is a vertical section taken upon line 13 13 of Fig. 12, looking in the direction of the arrows in said figure. Fig. 14 is a detail section taken upon the line 14 14 of Fig. 3. Fig. 15 is a horizontal section taken upon line 15 15 of Fig. 14, looking upwardly.

In the drawings, A indicates the frame of the machine as a whole. Said frame may be of any suitable form.

B is a block having two oblique faces on its upper surface, and which is attached to the frame at the front of the latter, said block constituting a support, upon which the corner of the box is placed at the time of applying the stay.

C is a shaft located in suitable bearings at the top of the frame, and by means of which motion is given to the several parts of the machine. Said shaft is provided with two main cam-wheels D and E, by which motion is given to the several parts of the machine.

G is a vertically-movable die or plunger arranged in guides *b b* upon the machine-frame and vertically over the form B.

H is a secondary plunger or strip-bender located at the rear of and sliding upon the main plunger G.

I is a lower die or anvil, which is supported upon the form B beneath the plunger G, and against which said plunger acts in the operation of the machine to press or clamp a stay-strip against a box-corner interposed between the said anvil or die and the said plunger. The upper surfaces *i i* of the anvil or die I are oblique and arranged at right angles with each other, and the upper die or plunger is also provided with working-faces *g g* at right angles with each other and forming an angular notch or recess, which fits over the die or anvil I, so as to press equally upon the adjacent sides of an interposed box-corner. The oblique sides of the die or anvil I and the form B are preferably made to approximately coincide with each other, so that both of said parts will afford support for the box corner in the operation of applying the stay thereto.

The die or anvil I is herein shown as made of square form and the block B as provided with a V-shaped notch *b* in its top to receive said die; but this particular shape of the said notch *b* and of the lower part of the anvil is obviously not essential, and they may be of any suitable shape. The said anvil I is herein shown as constructed to move horizontally and as extending through a horizontal bearing-aperture *a* in the frame, by which it is supported, a horizontal movement being given to the said anvil to aid in turning in or pasting the stay-strips to the inside of the box-corner, as will hereinafter appear.

J is a well or receptacle for paste, located at one side of the clamping-dies, and K a reel, on which is wound a strip of paper or other fabric from which the stays are to be formed.

O is a pasting or gluing roller mounted in bearings over and extending into the well or receptacle J, and over which the strip passes from the reel K, and M N are feed-rollers operating in connection with an elastic bed L to feed forward the continuous stay-strip from the glue-roller toward and between the clamping-dies. The said elastic bed L consists of a series of parallel bars or wires *l l l*, Figs. 11, 12, and 13, which are secured at their ends in the frame at either side of the rollers M and N. The lower feed-roller N is mounted to turn freely in its bearings, and is provided with a plurality of circumferential grooves to receive the bars or wires *l l l* of the elastic bed L, the narrow annular flanges or ribs formed by said grooves projecting upwardly between said bars or wires, so as to bear upon the under surface of the stay-strip. The said roller N is shown as mounted in a movable frame N′, sustained by a spring-arm *n*, which holds the roller N against the stay-strip. A cutting device for severing the continuous strip into pieces of suitable lengths to form the stay-strips or fastening-strips is located between the feed-rollers and the clamping-dies, and consists, as herein shown, of a stationary blade or cutter P, secured to the machine-frame at one side of the clamping-dies, and a vibrating knife or blade Q, pivoted to the said frame. The stationary blade or cutter P is herein shown as attached to an overhanging horizontal part A′ of the frame, which projects forward at one side of the clamping-dies, and on which the lower feed-roller N and elastic bed are supported, said part A′ being provided with a recess or opening to receive said lower feed-roller and the movable frame N′. The movable knife or blade Q is shown as located between the stationary blade and the clamping-dies and as mounted on a pivot *q*, secured on the part A′ of the frame.

Means are provided for actuating the several parts above described as follows: The cam-wheel D is located adjacent to and at the rear of the plunger G, and the latter is provided with a stud or roller *c*, which engages with a cam-groove *d* on said cam-wheel, said cam-groove being so shaped as to give vertical reciprocatory motion to the plunger, and having a concentric part *d′*, which gives a dwell to the plunger when the latter is at the lower limit of its movement, and with an inwardly-deflected part $d^2$, which accomplishes the lifting and depression of said plunger. Said plunger G is preferably divided transversely into two separate parts G and G′, connected with each other by a sliding joint and having between them a rubber or other spring $G^2$, by means of which the lower portion of the plunger is adapted to yield upwardly to a slight extent when brought down upon the box, thus preventing shock and liability of breakage and rendering the upper plunger adjustable to boxes of different thicknesses.

The secondary plunger or strip-bender H, which, as hereinbefore stated, operates in connection with the reciprocating die I for turning in the end of the stay-strip, rests and slides in a groove in the back of the main plunger G, Figs. 4 and 5, and is provided with a projection or shoulder *g′*, adapted for engagement with the cam-surface D′ upon the rim of the cam-wheel D. The said cam-wheel is provided at one part of the said cam-surface D′ with a cam projection $d^3$, which acts to advance or depress said secondary plunger H relatively to the plunger G at a desired time in the operation of the parts. The plunger H is retracted or drawn up and held in contact with the rim of the cam D by means of a coiled spring *h*, which acts upon the plunger G and said plunger H. In the particular construction illustrated the said coiled spring *h* is located in a groove of the secondary plunger H, the lower end of the spring being attached to the secondary plunger, and the upper end thereof being attached to a pin *h′*, which projects from the main plunger into the said groove.

The horizontally-movable die I is provided at its rear end with a stud *i′*, which rests in a cam-groove *j* in the cam-wheel E, said cam-groove being located in the outer or cylindric face of the cam-wheel, and being provided with a straight part *e′*, which retains the die I in its forward or operative position during the greater part of the revolution of the cam, and with a rearwardly-deflected part $e^2$, which moves said die I backwardly or rearwardly, and then again forward to its normal position to accomplish the turning in of the stay-strip.

The upper feed-roller M is preferably corrugated or roughened on its surface, and serves, in connection with the elastic bed L, to carry or feed the strip forward over the said elastic bed. The said upper roller is operated by means of a segmental gear E′ on the cam-wheel E, which segmental gear engages with a cog-wheel *m* on the shaft of the roller M. Said segmental gear operates to turn the feed-roller once at each rotation of the cam-wheel a distance sufficient to feed forward a part of the strip of sufficient length to form a stay-strip.

The cutting device for severing the paper is actuated as follows: The movable blade or cutter Q is extended at its inner end past its pivotal point, so as to form a projecting arm Q′, which is pivoted at its rear end to a vertical slide R, which is held in the guide R′ on the machine-frame and is adapted to move vertically therein. Said slide-bar R is provided with a stud *r*, which rests in a cam-groove $e^3$ of the cam-wheel E, which cam-groove is so shaped as to actuate said movable blade at the proper time to sever the strip, and having for this purpose a concentric part $e^4$, which acts to hold the movable blade elevated, and an inwardly-deflected part $e^5$, which acts to depress and elevate the said movable blade for severing the strip.

The machine may be driven by any suitable means, that shown in the drawings consisting of a belt-pulley S, mounted on the shaft C and adapted for connection therewith by means of a clutch *s*, which is connected with a treadle T at the bottom of the machine.

The operation of the machine, constructed as above described, is as follows: The continuous strip of paper or other fabric is drawn from the reel K by the feeding devices over the pasting-roller O, by which a suitable supply of adhesive material is applied to the lower side thereof. The strip is fed by the feeding devices between the blades P and Q of the cutting device and over the box-corner resting on the form B and die I at a time when the upper plunger is elevated and the die I is in its advanced or outward position, the gear-segment E′ being so located as to engage and operate the cog-wheel *m*, and thereby turn the feed-rollers when the main plunger is held in its elevated position by the engagement of the roller *g* with the concentric part *d′* of the cam-groove *d*. After the end of the strip has been advanced over the box-corner the cutting device is operated to sever the stay from the continuous strip, and the plunger G at the same time descends and presses the cut strip against the corner of the box and secures the same to the box-walls at either side of the corner. The movable blade Q of the cutting device is actuated at the proper time by the action of the inwardly-deflected part $e^5$ of the cam-groove $e^3$, which is so located as to give movement to the said blade shortly after the feed-roller ceases to move. The descent of the plunger G begins about the time the said blade begins to move, and the movement of the blade is somewhat faster than that of the plunger, owing to the fact that the roller *c* of said plunger is at this time in the central portion of the part $d^3$ of the cam-groove *d*, while the roller *r* is moving along the abrupt part of the groove $e^3$, so that the movable blade will have completed the effective part of its stroke at about the time that the plunger reaches a point opposite the stationary blade. In other words, the movable blade and plunger move downwardly at about the same time and the plunger reaches the level of the strip about the time that the same is severed by the cutters. Inasmuch as the corner or apex of a box resting upon the die I stands only slightly below the level of the stationary blade, after the strip has been fed forward over the box-corner, it will either fall upon and adhere to the box-corner before it is severed from the continuous strip or it will be carried downwardly against the box-corner by the descending plunger at the moment it is severed and before gravity has had time to act. In either case the liability of the severed strip being displaced after it is cut from the main or continuous strip is obviated, it being obvious that if from the stiffness of the material used for the stay-strip the end thereof which is thrust forward by the feed-rollers over the box-corner does not fall or bend by gravity, so as to bring its adhesive lower surface against the box-corner, the advance edges of the descending plunger, acting against one or both ends of the cut-off strip at the time the same is severed, will bring the middle of the strip immediately into contact with the box-corner, and thereby hold the strip in place until the end portions of the strip are carried downwardly and pressed against the sides of the box.

The machine herein shown is, as hereinbefore stated, constructed to turn into the inside of the box the projecting end of the stay, and for this purpose the stay-strip is made of such width and its guides are so arranged that the inner edge of the strip extends over or past the edge of the box-wall, so that when the stay is pasted down on the outside of the box-corner a loose or free end projects outward beyond the inner edge of the box. After the plunger G has pressed the stay upon the box the secondary plunger or strip-bender H then descends and bends or turns this loose end vertically downward, as shown in Fig. 8. This movement of the plunger H is accomplished by the action on the projection *d′* of the cam projection $d^3$ of the cam-surface D′. The secondary plunger then rises, and the die I, which has withdrawn from the notch *a* while the plunger H was descending by the action of the deflected part $e^2$ of the cam-groove *e*, moves forward again, and, catching the bent-down end of the stay, thrusts the same inside of the box-cover and presses it against the inside of the box, the upper plunger G meanwhile resting upon the box-corner, so as to retain the latter in place during the movement of the die I.

The operation of the parts in turning in the strip is clearly shown in Figs. 8 and 9, Fig. 8 showing the position of the parts when the die is withdrawn and the plunger H advanced or depressed to bend downwardly the overhanging inner end or edge of the strip, and Fig. 9 showing the die I during its forward movement after the end of the strip has been carried inwardly and pressed against the inside of the box. During the withdrawal of the die I in the manner described the box-corner is sustained in position by means of the form B, the inclined sides of which, as before stated, are arranged in alignment with the working-faces of said die I. The main purpose of said form B is to sustain the box-corner when the die I is withdrawn; but said form is herein shown as made solid and provided with a notch to receive the end of the die I, so that the form serves as a support for the said die under the downward pressure of the upper die or plunger, but by making the lower die I of sufficient strength or stiffness the use of the form B as a support therefor will not be necessary.

In many boxes the stay is simply pasted against the exterior surface of the box-corner and is not turned in or over the edge of the same, in which case the work can be done by using a non-reciprocating angular lower die or anvil and a single upper die or plunger. In such case the form B will obviously not be necessary as a part separate from the die; or, in other words, a single lower die or form will take the place of the form B and movable lower die I.

In some cases a continuous stay-strip may be employed, which is covered or coated with dry adhesive material, in which case water will be used in the receptacle J and the roller O will operate to moisten the strip only.

As far as the main features of my invention are concerned, forms other than those illustrated of the several parts of the machine may be employed without departure from my invention—as, for instance, in place of the particular mechanisms shown for feeding or delivering fastening-strips or stay-strips to and between the clamping-dies, or for applying paste or glue to the said stay-strips—other forms of strip feeding and pasting devices may be used in practice with the same general result, as above described.

I claim as my invention—

1. The combination, with opposing clamping-dies having diverging working-faces, of a feeding mechanism constructed to deliver stay-strips between said clamping-dies, and a pasting mechanism for rendering adhesive the stay-strips, said clamping-dies being constructed to co-operate in pressing upon interposed box-corners the adhesive stay-strips, substantially as described.

2. The combination, with opposing clamping-dies having diverging working-faces, said clamping-dies being arranged to co-operate in pressing adhesive fastening-strips upon interposed box-corners, a feeding mechanism constructed to feed forward a continuous fastening-strip, and a cutter for severing the said continuous strip into stay-strips of suitable lengths, substantially as described.

3. The combination, with opposing clamping-dies having diverging working-faces, said clamping-dies being arranged to co-operate in pressing an adhesive fastening-strip upon the corner of an interposed box, a feeding mechanism constructed to feed between the dies a continuous fastening-strip, a pasting mechanism for applying adhesive substance to the strip, and a cutter for severing the strip into stay-strips of suitable lengths, substantially as described.

4. The combination, with opposing clamping-dies having diverging working-faces, said clamping-dies being constructed to co-operate in pressing an adhesive fastening-strip upon an interposed box-corner, of a movable plunger or strip-bender constructed to bend downwardly or inwardly a projecting end of the stay-strip, that one of the clamping-dies which engages the inner surface of the box-corner being movable into and out of its usual working position, whereby it may engage and carry inside of the box-corner the said projecting end of the stay-strip, substantially as described.

5. The combination, with opposing clamping-dies having diverging working-faces, said clamping-dies being constructed to co-operate in pressing an adhesive fastening-strip upon an interposed box-corner, of a movable plunger or strip-bender constructed to bend downwardly or inwardly a projecting end of the stay-strip, that one of said clamping-dies which engages the inner surface of the box-corner having a reciprocatory motion in a direction parallel with the box-corner, so as to carry inward and press against the inside of the box-corner the said projecting end of the stay-strip, substantially as described.

6. The combination of opposing clamping-dies having diverging working-faces constructed to co-operate in pressing an adhesive stay-strip upon an interposed box-corner, one of said clamping-dies being constructed to act with an elastic or yielding pressure to enable the dies to operate upon box-corners of different thicknesses, substantially as described.

7. The combination, with opposing clamping-dies having diverging working-faces, said clamping-dies being arranged to co-operate in pressing an adhesive fastening-strip upon an interposed box-corner, of a feeding mechanism constructed to feed forward a continuous fastening-strip, a cutter for severing the strip into suitable lengths, and a movable part or plunger which bends downwardly or inwardly the projecting end of the fastening-strip, that one of the clamping-dies which engages the inside of the box-corner being constructed to reciprocate in a direction parallel with the box-corner, substantially as described.

8. The combination, with a form or stationary die provided with a recess or notch, of a reciprocating die constructed to fit the notch and having diverging working-faces, a movable die or plunger provided with diverging working-faces corresponding with those of the said reciprocating die, and a secondary movable die or plunger constructed to bend downwardly or inwardly the projecting end of the fastening-strip into position to be caught by the reciprocating die, substantially as described.

In witness whereof I have hereunto signed my name in the presence of two subscribing witnesses.

FRED H. BEACH.

Witnesses:
MARK D. KNOWLTON,
N. A. GLAZIER.